Jan. 3, 1961   W. G. YOUNG   2,967,041
VALVES
Filed Aug. 2, 1954   7 Sheets-Sheet 1

FIG. 1.

INVENTOR.
WILLIAM G. YOUNG
BY Hoopes, Leonard & Buell
his attorneys

Jan. 3, 1961  W. G. YOUNG  2,967,041
VALVES
Filed Aug. 2, 1954  7 Sheets-Sheet 2

FIG. 2.

INVENTOR.
WILLIAM G. YOUNG

Jan. 3, 1961 W. G. YOUNG 2,967,041
VALVES
Filed Aug. 2, 1954 7 Sheets-Sheet 3

FIG. 3.

INVENTOR.
WILLIAM G. YOUNG
BY
his attorneys

Jan. 3, 1961 W. G. YOUNG 2,967,041
VALVES
Filed Aug. 2, 1954 7 Sheets-Sheet 4

FIG. 4.

INVENTOR.
WILLIAM G. YOUNG

Jan. 3, 1961   W. G. YOUNG   2,967,041
VALVES
Filed Aug. 2, 1954   7 Sheets-Sheet 5

FIG. 5.

INVENTOR.
WILLIAM G. YOUNG

United States Patent Office 2,967,041
Patented Jan. 3, 1961

2,967,041
VALVES

William G. Young, McCandless Township, Allegheny County, Pa., assignor, by mesne assignments, to Miller Printing Machinery Co., Pittsburgh, Pa., a corporation of Pennsylvania Filed Aug. 2, 1954, Ser. No. 447,364

9 Claims. (Cl. 251—166)

This invention relates to a valve and particularly to an improved plug-type valve for use in the control of fluid materials. Plug-type valves of various types have been heretofore proposed. For example, Heinen Patent No. 2,596,075, issued May 6, 1952, illustrates and describes a plug-type valve which is provided with wedges and a central plug to seal the passage through the valve when the valve is in the closed position and to open the passages through the valve when in the open position without scoring or damaging either the face of the wedges or the valve body itself. The Heinen patent operates by raising the plug between the wedges to free the wedges from the openings before the plug and wedges are rotated in the valve body. This is accomplished by raising the plug on a threaded trunnion until the plug jams against a mating surface on the valve rotating mechanism after which the plug and wedges rotate with the valve rotating mechanism.

I have invented an improved valve structure the preferred form of which provides a valve comprising a valve body, opposed ports in said body intersected by hollow bores, a plug mounted in the bore, a pair of wedges on the plug, said plug and wedges having tapered engaging surfaces sliding relative to one another, a stem on the plug, a control shaft extending into the body, means on the control shaft whereby rotation of the control shaft slides the plug relatively to the wedges, a collar fixed to the stem, an annular disc formed on the control shaft in a plane generally parallel to the plane of the collar, means on one of said disc and collar causing said disc and collar to rotate in unison in spaced-apart relation when the plug is moved axially to release the wedges from the body, and drive means on the collar and engageable with the disc to rotate the plug. Preferably the means on one of said disc and collar causing the disc and collar to move in unison in spaced-apart relation is a lug on the collar extending axially of the stem above the top surface of the collar and engageable in a recess in the disc. Alternately the lug may project axially from the disc and engage a mating surface on the collar. Preferably the drive means is a spring-loaded pin, however, it may be a pivoted dog or other suitable means.

In the foregoing statement I have pointed out certain salient features, objects and advantages of my invention, however, other advantages, objects and features will be apparent from a consideration of the following description and accompanying drawings in which.

Figure 1:
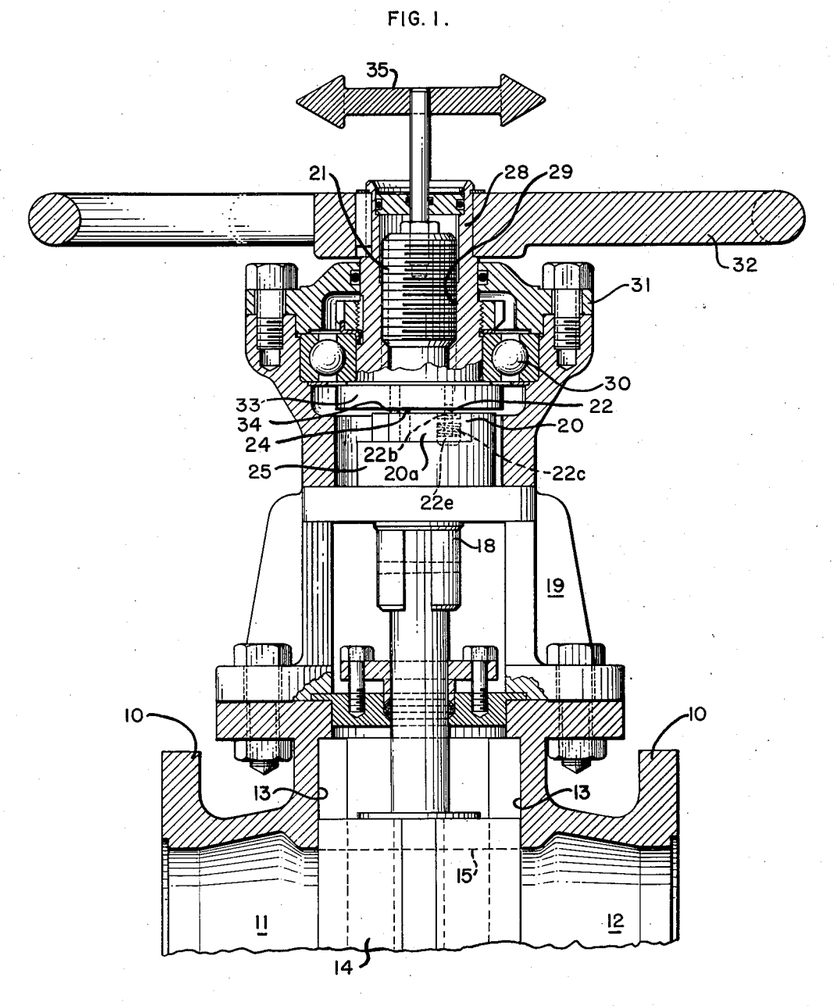
Figure 1 is a section through the valve of a preferred embodiment of my invention.
Figure 2:
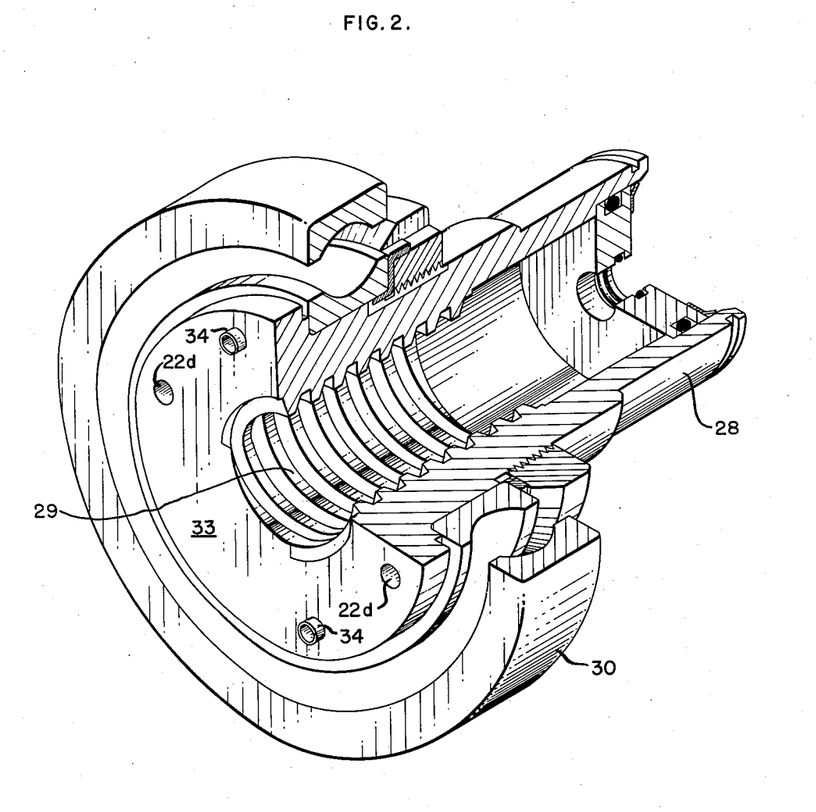
Figure 2 is an isometric view partly in section of a control shaft used in the preferred embodiment of my invention.
Figure 3:
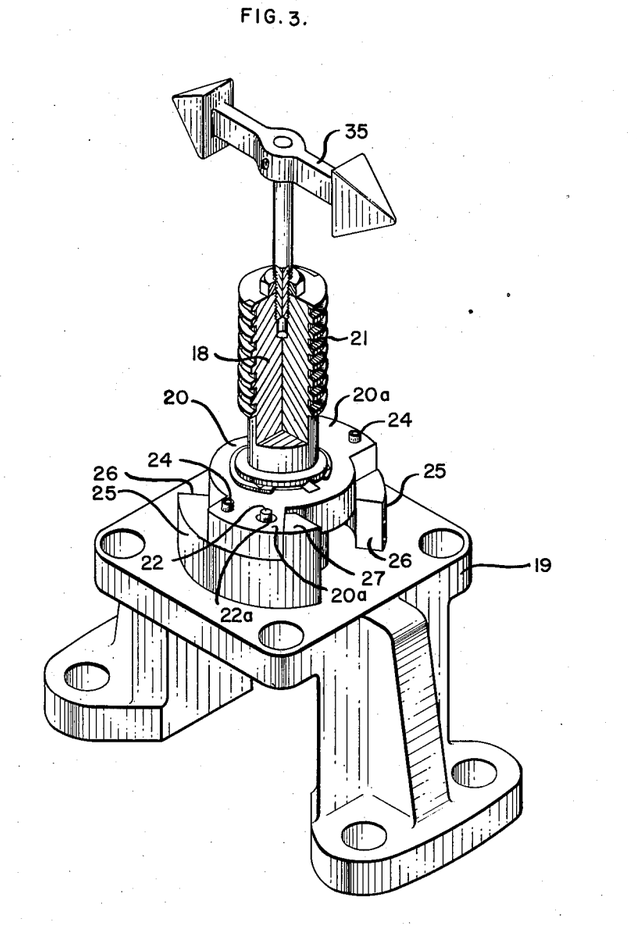
Figure 3 is an isometric view partly in section of the stem and collar mechanism used in the preferred embodiment of my invention.

Referring to the drawings I have illustrated a valve body 10 in which are formed two ports 11 and 12, a cylindrical bore 13 intersects the passages 11 and 12. A plug 14 is rotatably mounted in the bore 13 and is provided with a passage 15 adapted to connect the ports 11 and 12 when properly positioned in the bore 13. A pair of wedges are mounted on tapered engaging surfaces on the plug 14 and are slidable relative thereto. The plug 14 is provided with a fixed threaded stem 18 which extends vertically above the bore 13. A cap frame 19 surrounds the stem 18 and is mounted on the valve body 10 above the bore 13. The stem is provided with a collar 20 having guide members 20a and a threaded portion 21. A pair of drive pins 22 are mounted in openings 22a on opposite sides of the collar 20. A spring snap ring 22b on the end of the drive pins limits the movement of the pins which are urged outwardly in the direction of the head 22e of the pin by springs 22c. A split ring 24 is fixed on the collar 20 adjacent each drive pin 22. The split rings 24 extend axially above the surface of the collar 20. The cap frame 19, forming a part of the valve body, is provided with semicylindrical members 25 which surround the stem. Each of the members 25 is spaced apart circumferentially to provide slots 26 into which the guide members 20a, the drive pins and lugs 24 are vertically slidable. Each of the members 25 is also provided with a stop member 27 at one end thereof, the edge of which preferably lies along a radial line from the center of the valve stem. A control shaft 28 fits over the stem and a threaded portion 29 therein engages the threaded portion 21 on the stem. The control shaft 28 is rotatably mounted in bearings 30 in an outer shell 31 and is provided with a handwheel 32 keyed to the top of the shaft 28. An annular disc 33 is provided at the lower end of the control shaft 28. A pair of spaced-apart downwardly projecting split rings 34 are attached to the bottom surface of the disc 33. These are adapted to engage the split rings 24 projecting upwardly from the collar 20. A pair of openings 22d are provided on the disc 33 to receive the end of the drive pins 22 when the pins are forced against the springs 22c to compress them. A directional indicator 35 extends upwardly from the stem 18 to indicate the position of the plug in the bore.

The valve operates in the following fashion. With the wedges tight against the walls of the bore 13 and the plug 14 in its lowermost position, the valve is closed. As the handle 32 is rotated in the counterclockwise direction the control shaft 28 rotates in the same direction about the stem 21 causing it to thread itself upwardly into the interior of the control shaft 28. As the stem rises the guide members 20a on the collar 20 rise vertically in the slots 26. As they clear the semicylindrical members 25 the split rings 24 are engaged in side by side relation by the split rings 34 on the control shaft. Further rotation of the handle and control shaft causes the split rings to move in unison to force the head 22e of the drive pin to ride over the edge of the slot 26 and the upper end thereof to enter the openings 22d in the disc 33 on the control shaft, and the stem and plug along with the wedges are rotated 90° to align the opening 15 in the plug with the passages 11 and 12 in the valve. As the control shaft completes the 90° rotation the guide members 20a engage the stop members 27 on the members 25 fixed in the valve body, preventing further rotation. When it is desired to close the valve the handle 32 is rotated in the clockwise direction carrying the control shaft 28 with it. At the same time the openings 22d on the control shaft which are loosely surrounding the pin 22 engage the end of the drive pins 22 and carry the stem and plug assembly 90° back into alignment with the slots 26 between the cylindrical members 25 at which point springs 22c disengage the pins 22 from springs 22d. Further rotation of the wheel 32 causes the stem to be threaded downwardly through the control shaft to move the plug 14 between the wedges to force them into tight sealing engagement with the bore 13 in the valve body.

Figure 4:
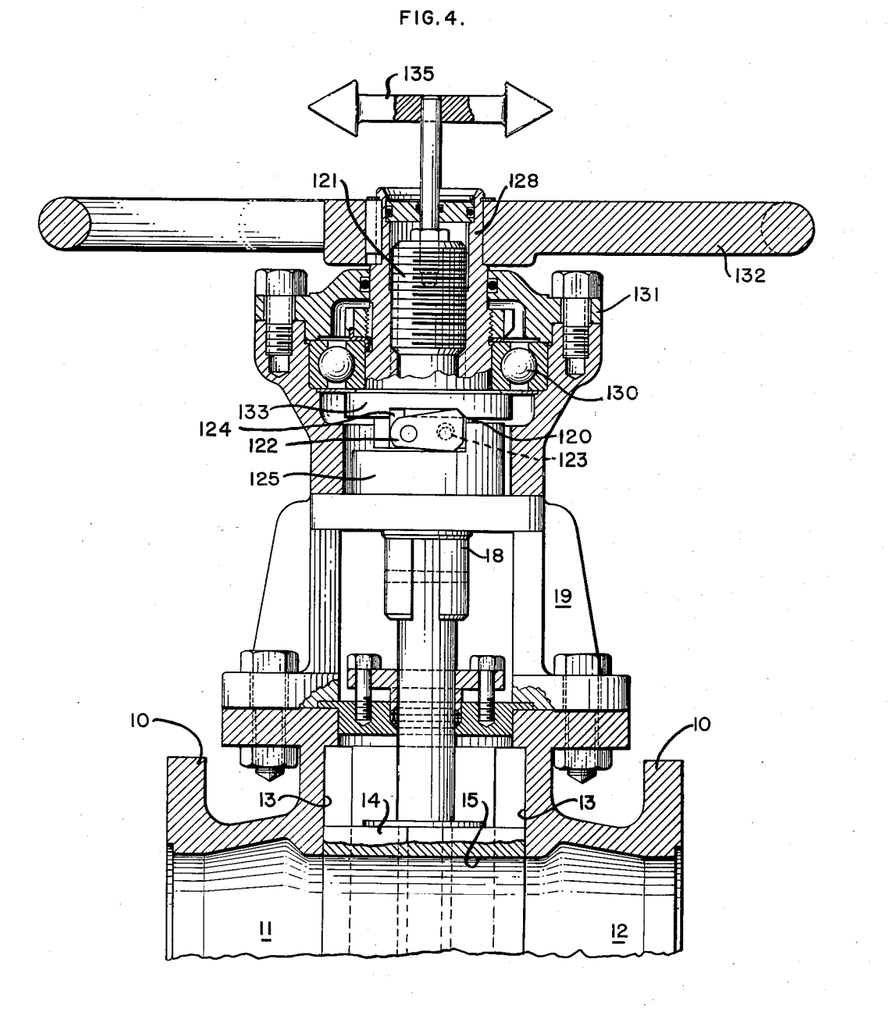
Figure 4 is a section through a valve of an alternative form of my invention.
Figure 5:
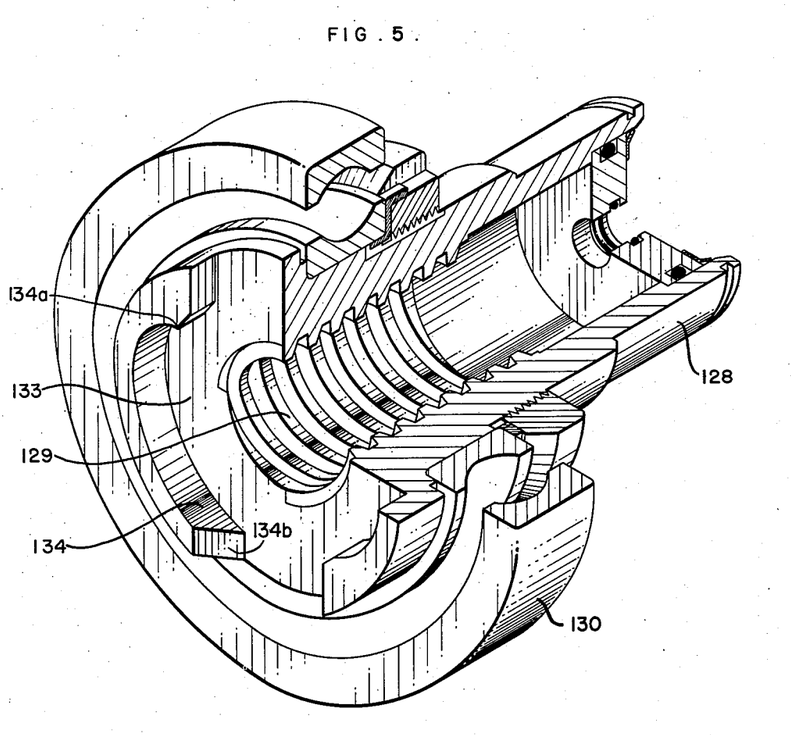
Figure 5 is an isometric view partly in section of a control shaft used in the embodiment of Figure 4.
Figure 6:
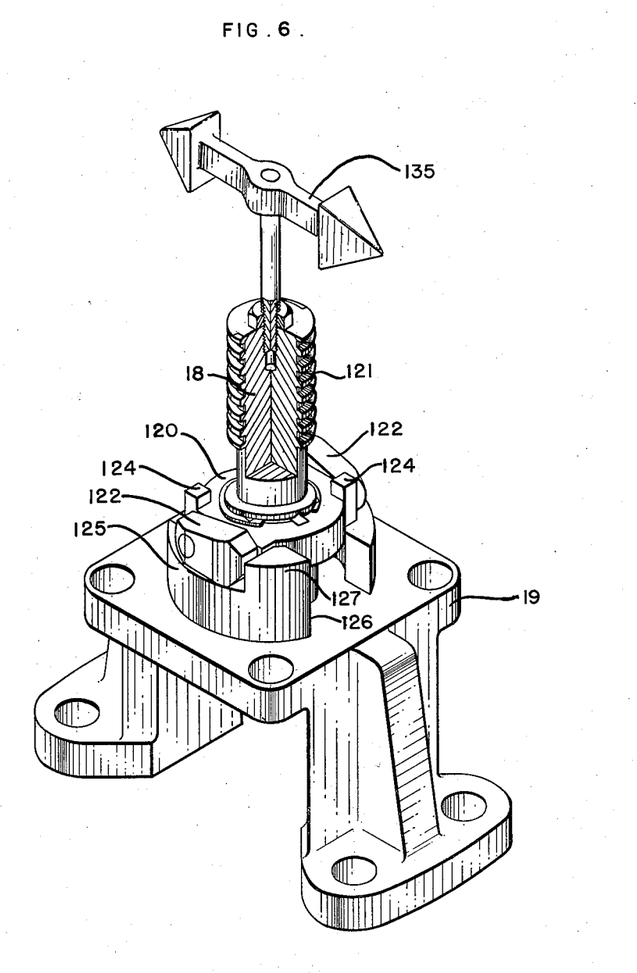
Figure 6 is an isometric view partly in section of the stem and collar mechanism of the embodiment of Figure 4.

Referring to Figures 4–6 I have illustrated another embodiment of my invention. In that embodiment I provide a valve body 10 in which are formed two ports 11 and 12, a cylindrical bore 13 intersects the passages 11 and 12. A plug 14 is rotatably mounted in the bore 13 and is provided with a passage 15 adapted to connect the ports 11 and 12 when properly positioned in the bore 13. A pair of wedges are mounted on tapered engaging surfaces on the plug 14 and are slidable relative thereto. The plug 14 is provided with a fixed threaded stem 18 which extends vertically above the bore 13. A cap frame 19 surrounds the stem 18 and is mounted on the valve body 10 above the bore 13. All this is identical with the like number parts of the embodiment described above and illustrated in Figures 1–3. The stem is provided with a collar 120 and a threaded portion 121. A pair of dogs 122 are pivotally mounted on opposite sides of the collar 120. A pin 123 in the collar cooperates with an opening in the dog 122 to limit the pivotal movement of the dog. A lug 124 is formed on the collar 120 adjacent the pivot point of each dog 122. The lugs 124 extend axially above the surface of the collar. The cap frame 19, forming a part of the valve body, is provided with semicylindrical members 125 which surround the stem. Each of the members 125 is spaced apart circumferentially to provide slots 126 into which the dogs 122 and lugs 124 are vertically slidable. Each of the members 125 is also provided with a stop member 127 at one end thereof. A control shaft 128 fits over the stem and a threaded portion 129 therein engages the threaded portion 121 on the stem. The control shaft 128 is rotatably mounted in bearings 130 in an outer shell 131 and is provided with a handwheel 132 keyed to the top of the shaft 128. An annular disc 133 is provided at the lower end of the control shaft 128. A pair of spaced-apart downwardly projecting semicircular flanges 134 are attached to the bottom surface of the disc 133. A directional indicator 135 extends upwardly from the stem 18 to indicate the position of the plug in the bore.

The valve of this embodiment operates in the following fashion. With the wedges tight against the walls of the bore 13 and the plug 14 in its lowermost position, the valve is closed. As the handle 132 is rotated in the counterclockwise direction the control shaft 128 rotates in the same direction about the stem 121 causing it to thread itself upwardly into the interior of the control shaft 128. As the stem rises the dogs 122 rise vertically in the slots 126. As they clear the semicylindrical members 125 the lugs 124 enter the spaces between the lugs 134 on control shaft 128. Further rotation of the handle and control shaft causes the lugs 124 to come into engagement with the enlarged end 134a of flanges 134 on the disc 133 and the stem and plug along with the wedges are rotated 90° to align the opening 15 in the plug with the passages 11 and 12 in the valve. As the control shaft completes the 90° rotation the dogs 122 engage the stop members 127 on the members 125 fixed in the valve body, preventing further rotation. When it is desired to close the valve the handle 132 is rotated in the clockwise direction carrying the control shaft 128 with it. At the same time the ends 134b of flanges 134 on the control shaft engage the dogs 122 and carry the stem and plug assembly 90° back into alignment with the slots 126 between the cylindrical members 125. Further rotation of the wheel 132 causes the stem to be threaded downwardly through the control shaft to move the plug 14 between the wedges to force them into tight sealing engagement with the bore 13 in the valve body.

Figure 7:
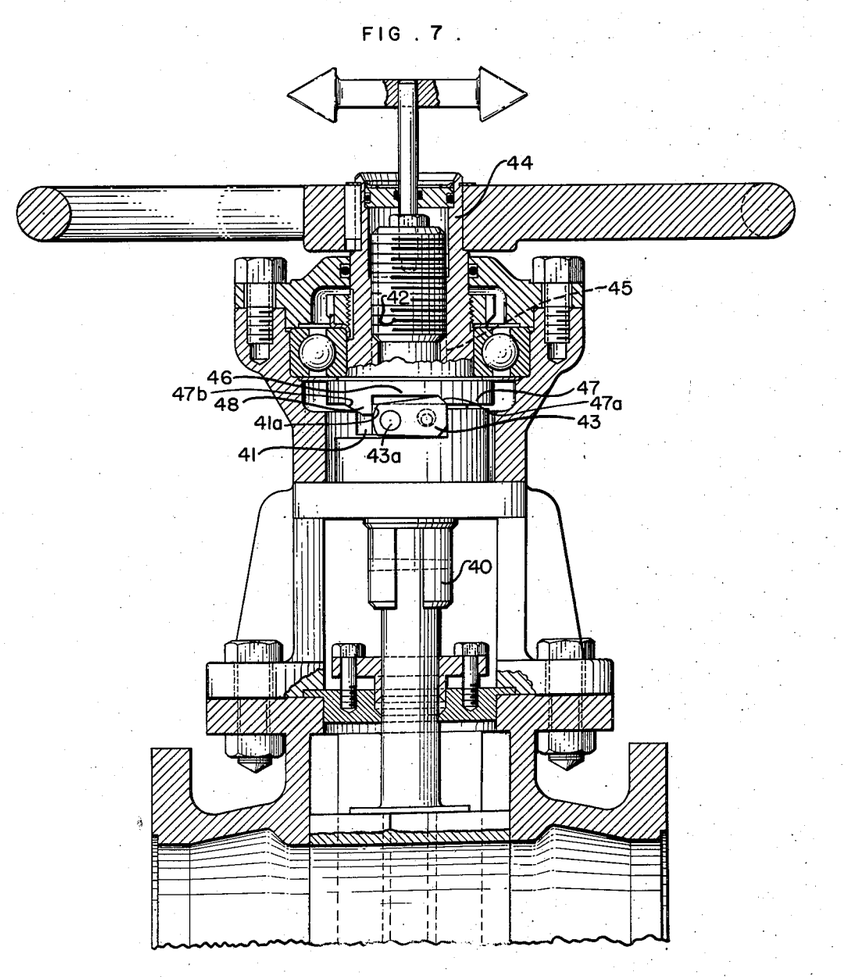
Figure 7 is a section of the valve of alternate form of my invention.

In the embodiment shown in Figure 7 I provide a threaded stem 40 identical with stem 18 of Figures 1–3, extending vertically out of the valve bore. The stem 40 is provided with a collar 41 and a threaded portion 42. A pair of dogs 43 are pivotally mounted on opposite sides of the collar in the same fashion as the dogs 122 in Figures 4–6. A control shaft 44 similar to shaft 128 of Figures 4–6 fits over the stem 40 and a threaded portion 45 therein engages the threaded portion 42 on the stem. An annular disc 46 is provided at the lower end of the control shaft. A pair of downwardly projecting semicircular flanges 47 are fixed to the bottom of the disc. These flanges 47 are substantially identical in shape to the flanges 134 of Figures 4–6 and like flanges 134 are provided with sloping ends 47a corresponding to the ends 134b of flanges 134. Each of the flanges 47 is provided at the end 47b with a downwardly projecting lug 48 adapted to engage a stop 41a on the collar 41 adjacent the pivot 43a for the dogs 43.

The operation of the modification shown in Figure 7 is generally the same as that described for the embodiment shown in Figures 4–6. As the control shaft 44 is rotated in the counterclockwise direction, the stem rises within the control shaft. The lug 48 engages the stop on the collar to rotate the plug and wedges when the stem has been raised in the control shaft. Similarly when the control shaft 44 is rotated in the clockwise direction, flange ends 47a engage the dogs 43 to rotate the dogs into position in the slot 126 (see Figure 6) and the plug returns to its original position just as in the embodiment of Figures 4–6.

While I have illustrated and disclosed a present preferred embodiment of my invention, it may otherwise be embodied within the scope of the following claims.

I claim:

1. In a valve having a valve body, opposed ports in said body intersected by a hollow cylindrical bore, a plug mounted in the bore for rotation and limited vertical movement, a pair of wedges on the plug, said plug and wedges having tapered engaging surfaces slidable relative to one another, a stem on the plug, a control shaft coaxial with and surrounding the stem over a part of its length, screw means on the control shaft engaging mating screw means on the stem whereby rotation of the control shaft moves the stem and thereby slides the plug relatively to the wedges, a collar fixed to said stem and rotatable therewith, an annular disc formed on the control shaft in a plane parallel to the plane of the collar, the improvement comprising slotted guide means having guide slots fixed about the stem, guide elements on the collar engageable in said guide slots, engaging means on at least one of said disc and collar spacing and engaging the other of said disc and collar in spaced-apart relation causing the disc and collar to rotate in unison in spaced-apart relation after the guide elements are moved axially in the guide slots, normally retracted vertically movable drive means on the collar engageable with the disc by means of the guide means to rotate the disc and collar in the direction to return the guide elements to the guide slots and permit the drive means to retract and disengage the disc from the collar whereby further rotation will cause said guide elements to move axially in said guide slots.

2. In a valve having a valve body, opposed ports in said body intersected by a hollow cylindrical bore, a plug mounted in the bore for rotation and limited vertical movement, a pair of wedges on the plug, said plug and wedges having tapered engaging surfaces slidable relative to one another, a stem on the plug, a control shaft coaxial with and surrounding the stem over a part of its length, screw means on the control shaft engaging mating screw means on the stem whereby rotation of the control shaft moves the stem and thereby slides the plug relatively to the wedges, a collar fixed to said stem and rotatable therewith, an annular disc formed on the control shaft in a plane parallel to the plane of the collar, the improvement comprising slotted guide means fixed about the stem, guide elements on the collar engageable in slots in the guide means, a lug on one of said disc and collar, stop means on the one of said disc and collar opposite the lug adapted to engage the lug holding said disc and collar in spaced-apart relation whereby the disc and collar rotate in spaced-apart relation after the guide elements are moved axially in the guide slots, normally retracted movable drive means on the collar engageable with the disc by means of the guide means to rotate the disc and collar in the direction to return the guide elements to the guide slots and permit the drive means to retract and disengage the disc from the collar whereby further rotation will cause said guide elements to move axially in said guide slots.

3. In a valve having a valve body, opposed ports in said body intersected by a hollow cylindrical bore, a plug mounted in the bore for rotation and limited axial movement, a pair of wedges on the plug, said plug and wedges having tapered engaging surfaces slidable relative to one another, a stem on the plug, a control shaft coaxial with and surrounding the stem over a part of its length, screw means on the control shaft engaging mating screw means on the stem whereby rotation of the control shaft moves the stem and thereby slides the plug relatively to the wedges, a collar fixed to said stem and rotatable therewith, guide means having guide slots fixed about the stem, guide elements on the collar engageable in said guide slots, an annular disc formed on the control shaft in a plane parallel to the plane of the collar, the improvement comprising a lug on the collar, a spring-loaded pin on the collar adjacent the lug, a mating lug on the disc whereby after the guide elements are moved axially in the guide slots, the disc and collar are rotated in unison in spaced-apart relation by means of the engagement of the lugs, and an opening in the disc receiving the end of the pin during rotation of the disc and collar, said pin engageable with the opening in the disc to return the guide elements to the guide slots and being released by the guide elements entering said slots.

4. In a valve having a valve body, opposed ports in said body intersected by a hollow cylindrical bore, a plug mounted in the bore for rotation and limited vertical movement, a pair of wedges on the plug, said plug and wedges having tapered engaging surfaces slidable relative to one another, a stem on the plug, a control shaft coaxial with and surrounding the stem over a part of its length extending into the body, screw means on the control shaft engaging mating screw means on the stem whereby rotation of the control shaft moves the stem and thereby slides the plug relatively to the wedges, a collar fixed to said stem and rotatable therewith, an annular disc formed on the control shaft in a plane parallel to the plane of the collar, the improvement comprising slotted guide means about the stem, guide elements on the collar engageable in slots in the guide means, drive means on one of said disc and collar causing the disc and collar to rotate in unison in spaced-apart relation after the guide elements are moved axially in the guide slots, and a spring-loaded pin on the collar engageable with the disc to rotate the disc and collar in the direction to return the guide elements to the guide slots and permit the drive means to retract and disengage the disc from the collar whereby further rotation will cause said guide elements to move axially in said guide slots.

5. In a valve having a valve body, opposed ports in said body intersected by a hollow cylindrical bore, a plug mounted in the bore for rotation and limited axial movement, a pair of wedges on the plug, said plug and wedges having tapered engaging surfaces slidable relative to one another, a stem on the plug, a control shaft coaxial with and surrounding the stem over a part of its length, screw means on the control shaft engaging mating screw means on the stem whereby rotation of the control shaft moves the stem and thereby slides the plug relatively to the wedges, a collar fixed to said stem and rotatable therewith, slotted guide means about the stem, guide elements on the collar engageable in said slotted guide means, an annular disc formed on the control shaft in a plane parallel to the plane of the collar, the improvement comprising a lug on one of said disc and collar, stop means on the other of said disc and collar opposite the lug adapted to engage the lug whereby the disc and collar rotate in one direction in spaced-apart relation when the stem is moved axially, a spring-loaded pin on the collar and engageable with the disc to rotate the disc and collar in the direction to return the guide elements to the guide slots and permit the drive means to retract and disengage the disc from the collar whereby further rotation will cause said guide elements to move axially in said guide slots.

6. In a valve as claimed in claim 5 wherein the spring-loaded pin is engageable in an opening in the disc.

7. In a valve as claimed in claim 1 wherein the drive means is a dog pivoted on the collar and engageable with the disc to rotate the disc and collar, and wherein said guide slots receive the dog when the guide elements are returned to the guide slots.

8. In a valve as claimed in claim 1 wherein the engaging means is a lug on the disc projecting out of the plane of the disc, and the drive means is a dog pivoted on the collar in the path of the lug whereby the disc and collar are caused to rotate in unison in spaced-apart relation.

9. In a valve as claimed in claim 2 wherein the lug is formed on the collar, the drive means is a dog pivoted on the collar adjacent the lug, and an annular flange on the disc, said flange having an opening therein adapted to receive the dog whereby the disc and collar are rotated in spaced-apart relation.

References Cited in the file of this patent

UNITED STATES PATENTS

| | | |
|---|---|---|
| 514,180 | Coale | Feb. 6, 1894 |
| 1,650,312 | Wildin | Nov. 22, 1927 |
| 1,864,596 | Jones | June 28, 1932 |
| 2,258,723 | Smolensky | Oct. 14, 1941 |
| 2,596,075 | Heinen | May 6, 1952 |
| 2,607,557 | Allen | Aug. 19, 1952 |
| 2,682,174 | Heinen | June 29, 1954 |
| 2,700,528 | Blackman | Jan. 25, 1955 |
| 2,749,082 | Allen | June 5, 1956 |
| 2,791,395 | Prescott | May 7, 1957 |

FOREIGN PATENTS

| | | |
|---|---|---|
| 11,764 | Great Britain | June 5, 1905 |
| 352,228 | Great Britain | July 9, 1931 |
| 461,653 | Great Britain | of 1937 |

UNITED STATES PATENT OFFICE
CERTIFICATION OF CORRECTION

Patent No. 2,967,041 January 3, 1961

William G. Young

It is hereby certified that error appears in the above numbered patent requiring correction and that the said Letters Patent should read as corrected below.

Column 3, line 8, for "springs" read -- openings --.

Signed and sealed this 13th day of June 1961.

(SEAL)
Attest:

ERNEST W. SWIDER
Attesting Officer

DAVID L. LADD
Commissioner of Patents